United States Patent [19]

Driskel

[11] Patent Number: 4,679,897
[45] Date of Patent: Jul. 14, 1987

[54] OPTICAL FIBRE ELEMENT FOR USE IN AN OPTICAL CABLE
[75] Inventor: Stephen P. Driskel, Astley, England
[73] Assignee: BICC Public Limited Company, London, England
[21] Appl. No.: 745,929
[22] Filed: Jun. 18, 1985
[30] Foreign Application Priority Data
Jun. 22, 1984 [GB] United Kingdom ............... 8415999
[51] Int. Cl.⁴ .................................................. G02B 6/44
[52] U.S. Cl. ................... 350/96.23; 174/70 R
[58] Field of Search ................... 350/96.23; 174/70 R
[56] References Cited
U.S. PATENT DOCUMENTS

| 4,138,193 | 2/1979 | Olszewski et al. | 350/96.23 |
| 4,178,069 | 12/1979 | Andersen et al. | 350/96.23 |
| 4,190,319 | 2/1980 | Eggleston | 350/96.23 |
| 4,230,395 | 10/1980 | Dean et al. | 350/96.23 |
| 4,355,865 | 10/1982 | Conrad et al. | 350/96.23 |

FOREIGN PATENT DOCUMENTS

| 1124561 | 6/1982 | Canada | 350/96.23 |
| 3131424 | 2/1983 | Fed. Rep. of Germany | 350/96.23 |
| 2014328 | 8/1979 | United Kingdom | 350/96.23 |
| 2017955 | 10/1979 | United Kingdom | 350/96.23 |

Primary Examiner—John Lee
Attorney, Agent, or Firm—Eugene F. Buell

[57] ABSTRACT

An optical fibre element suitable for loosely housing in a bore of an optical cable comprises a plastics tape having transversely spaced on and secured to one of its major surfaces two plastics insulated electric conductors extending lengthwise of the tape and a second plastics tape overlying and secured to the plastics insulated conductors to form between the pair of plastics insulated conductors an elongate compartment. Loosely housed in the elongate compartment is an optical fibre ribbon comprising a plurality of optical fibres arranged side by side and embedded in an elongate plastics body. Each conductor may be of a resilient metal and/or each plastics tape may be of a resilient plastics material and each conductor and/plastics tape may be resiliently set in such a form that the optical fibre element follows a path of smoothly curved undulations whose axes of curvature lie transverse to the longitudinal axis of the element.

10 Claims, 1 Drawing Figure

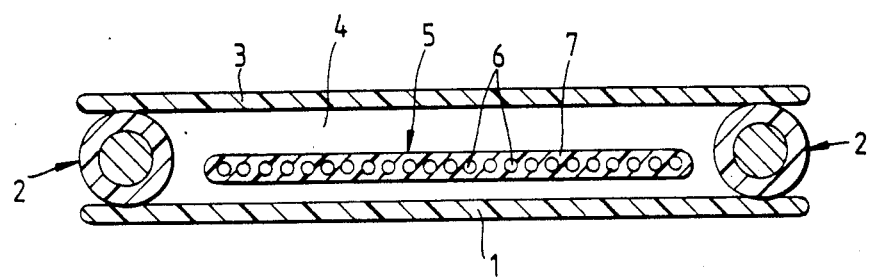

OPTICAL FIBRE ELEMENT FOR USE IN AN OPTICAL CABLE

This invention relates to optical fibre elements for the transmission of the ultra-violet, visible and infra-red regions of the electromagnetic spectrum, which regions, for convenience, will hereinafter all be included in the generic term "light" and especially, but not exclusively, to optical fibre elements for use in the communications field adapted for transmission of light having a wavelength within the range 0.8 to 1.9 micrometers.

It is an object of the present invention to provide an improved optical fibre element which, in its preferred form, is especially, but not exclusively, suitable for use in an optical cable or other application where there is a risk that optical fibres will be subjected to a tensile force.

According to the invention, the improved optical fibre element comprises a tape of plastics material having two oppositely disposed major surfaces and having transversely spaced on and secured to one of its major surfaces at least two plastics insulated electric conductors extending lengthwise of the tape; a second tape of plastics material having two oppositely disposed major surfaces, which second tape overlies the transversely spaced plastics insulated electric conductors with one of its major surfaces secured thereto to form between the adjacent pair of plastics insulated conductors an elongate compartment; and, loosely housed in the elongate compartment or in at least one of the elongate compartments, at least one optical fibre ribbon comprising a plurality of optical fibres arranged side by side and embedded in an elongate body of plastics material, the diameters of the plastics insulated electric conductors each being substantially greater than the smaller transverse dimension of the optical fibre ribbon and the transverse distance between said pair of plastics insulated electric conductors being substantially greater than the larger transverse dimension of the optical fibre ribbon.

The plastics insulated conductors are preferably secured to said major surfaces of the plastics tapes by fusion bonding or by an intermediate layer of resin or other adhesive.

Where the improved optical fibre element is to be used in an optical cable or other application where there is a risk that optical fibres will be subjected to a substantial tensile force, preferably each electric conductor is of a resilient metal or metal alloy and/or each plastics tape is of a resilient plastics material and each plastics insulated resilient electric conductor and/or each plastics tape is set in such a form that the optical fibre element follows a path of smoothly curved undulations whose axes of curvature lie transverse to the longitudinal axis of the element, the arrangement being such that, when the undulating optical fibre element is subjected to a tensile force, the element will tend to straighten in a lengthwise direction against the action of the undulating plastics insulated resilient electric conductors and/or the undulating plastic tapes thereby reducing the tensile force applied to the optical fibres and, when the tensile force is removed, the optical fibre element will return towards its original undulating form.

Preferably, the axes of curvature of the undulations lie parallel to one another and substantially normal to the longitudinal axis of the optical fibre element.

For optical fibres having an overall diameter of 250 micrometers, preferably the radius of curvature of each undulation of the undulating optical fibre element is not less than 40 mm.

The smoothly curved undulations in the improved optical fibre element preferably are formed by causing the optical fibre element to travel in the direction of its length and to be partially wrapped around each of a plurality of transversely extending, longitudinally spaced formers of substantially circular or partially circular cross-section travelling in the same direction as the advancing optical fibre element and at such a speed that there is substantially no relative movement between the advancing formers and the optical fibre element travelling therebetween, the direction of wrap around one former being in the opposite circumferential direction to the direction of wrap around the or each adjacent former and the circumferential extent of wrap around each of the formers being such that each plastics insulated resilient electric conductor is set in such a form that the optical fibre element follows a path of smoothly curved undulations whose axes of curvature lie transverse to the longitudinal axis of the element.

Preferably, the transversely extending longitudinally spaced formers are carried on a pair of advancing endless belts, the formers on one belt inter-engaging between the formers on the other belt.

Each of the formers may have a radius of curvature substantially less than the desired radius of curvature of each undulation of the undulating optical fibre element since, during manufacture of the undulating optical fibre element, the element is caused to follow a path of smoothly curved undulations whose radii of curvature are substantially less than the desired minimum value for only a very brief period, no permanent damage is caused to the optical fibres which would affect their light transmission efficiency or their long term strength.

Preferably, the set in the plastics insulated resilient electric conductors is mechanically formed by causing the advancing optical fibre element to be partially wrapped around each of a plurality of formers of such diameter and so spaced apart and staggered in respect to the rectilinear advancing optical fibre element that the plastics insulated resilient electric conductors are deformed beyond their elastic limit.

Additionally or alternatively, each of the plastics tapes may be of polyethylene teraphthalate or other resilient plastics material and, in this case, each resilient tape may be set in smoothly curved undulations by heating the advancing optical fibre element upstream of the plurality of transversely extending, longitudinally spaced formers, say to a temperature of approximately 150° C. and, as the optical fibre element is passing through the plurality of formers, cooling the element, e.g. by blowing cold air on to the formers, to such an extent that undulations having the desired radius of curvature are set in the resilient tapes of the element.

The invention also includes an optical cable having an outer sheath of plastics material and having, extending throughout its length, at least one bore in which is loosely housed at least one improved optical fibre element as hereinbefore described.

The sheath may bound a single bore extending along the length of the optical cable or it may surround two or more separately formed tubes of plastics material, the bore of at least one of said tubes having loosely housed therein at least one improved optical fibre element as hereinbefore described.

In all cases, the or each bore loosely housing an improved optical fibre element may be substantially filled throughout its length with a greasy water-impermeable medium, such as a water-impermeable medium consisting of, or comprising as a major constituent, petroleum jelly, or with a silicone gel.

The invention is further illustrated by a description, by way of example, of a preferred optical fibre element with reference to the accompanying drawing which shows, on an enlarged scale, a transverse cross-sectional view of the optical fibre element.

Referring to the drawing, the preferred optical fibre element comprises a tape 1 of plastics material which has a width of 6 mm and a thickness of 500 micrometers and which has transversely spaced on and secured to one of its surfaces two plastics insulated copper conductors 2 extending lengthwise of the tape and having an overall diameter of 1 mm. A second tape 3 of plastics material of the same width and thickness as tape 1 overlies and is fusion bonded to the transversely spaced plastics insulated copper conductors 2 to form between the conductors an elongate compartment 4. Loosely housed in the elongate compartment 4 is an optical fibre ribbon 5 comprising a plurality of optical fibres 6 arranged side by side and embedded in an elongate body 7 of plastics material. Each plastics insulated copper conductor 2 and each tape 1, 3 is set in such a form that the optical fibre element follows a path of smoothly curved undulations whose axes of curvature lie transverse to the longitudinal axis of the element. When the undulating optical fibre element is subjected to a tensile force, the element will tend to straighten in a lengthwise direction against the action of the undulating copper conductors 2 and undulating tapes 1, 3 thereby reducing the tensile force applied to the optical fibres 6 and, when the tensile force is removed, the optical fibre element will return towards its original undulating form.

What I claim as my invention is:

1. An optical fibre element comprising a tape of plastics material having two oppositely disposed major surfaces and having transversely spaced on and secured to one of its major surfaces at least two plastics insulated electric conductors extending lengthwise of the tape; a second tape of plastics material having two oppositely disposed major surfaces, which second tape overlies the transversely spaced plastics insulated electric conductors with one of its major surfaces secured thereto to form between adjacent pair of plastics insulated conductors an elongate compartment; and, loosely housed in the elongate compartment, at least one optical fibre ribbon comprising a plurality of optical fibres arranged side by side and embedded in an elongate body of plastics material, the diameters of the plastics insulated electric conductors each being substantially greater than the smaller transverse dimension of the optical fibre ribbon and the transverse distance between said pair of plastics insulated electric conductors being substantially greater than the larger transverse dimension of the optical fibre ribbon.

2. An optical fibre element as claimed in claim 1, wherein the plastics insulated conductors are secured to said major surfaces of the plastics tapes by fusion bonding.

3. An optical fibre element as claimed in claim 1, wherein the plastics insulated conductors are secured to said major surfaces of the plastics tapes by an intermediate layer of adhesive.

4. An optical fibre element as claimed in claim 1, wherein each electric conductor is of a resilient metal or metal alloy and each plastics insulated electric conductor is set in such a form that the optical fibre element follows a path of smoothly curved undulations whose axes of curvature lie transverse to the longitudinal axis of the element, the arrangement being such that, when the undulating optical fibre element is subjected to a tensile force, the element will tend to straighten in a lengthwise direction against the action of the undulating plastics insulated electric conductors thereby reducing the tensile force applied to the optical fibres and, when the tensile force is removed, the optical fibre element will return towards its original undulating form.

5. An optical fibre element as claimed in claim 1, wherein each plastics tape is of a resilient plastics material and each plastics tape is set in such a form that the optical fibre element follows a path of smoothly curved undulations whose axes of curvature lie transverse to the longitudinal axis of the element, the arrangement being such that, when the undulating optical fibre element is subjected to a tensile force, the element will tend to straighten in a lengthwise direction against the action of the undulating plastics tapes thereby reducing the tensile force applied to the optical fibres and, when the tensile force is removed, the optical fibre element will return towards its original undulating form.

6. An optical fibre element as claimed in claim 4 or 5, wherein the axes of curvature of the undulations lie parallel to one another and substantially normal to the longitudinal axis of the optical fibre element.

7. An optical fibre element as claimed in claim 4 or 5, wherein each optical fibre has an overall diameter of 250 μm and the radius of curvature of each undulation of the undulating optical fibre element is not less than 40 mm.

8. An optical fibre element as claimed in claim 5, wherein each of the plastics tapes is of polyethylene terephthalate.

9. An optical cable having an outer sheath of plastics material and having, extending throughout its length, at least one bore in which is loosely housed at least one optical fibre element as claimed in claim 1.

10. An optical cable having an outer sheath of plastics material which surrounds at least two separately formed tubes of plastics material, the bore of at least one of said tubes having loosely housed therein at least one optical fibre element as claimed in claim 1.

* * * * *